UNITED STATES PATENT OFFICE.

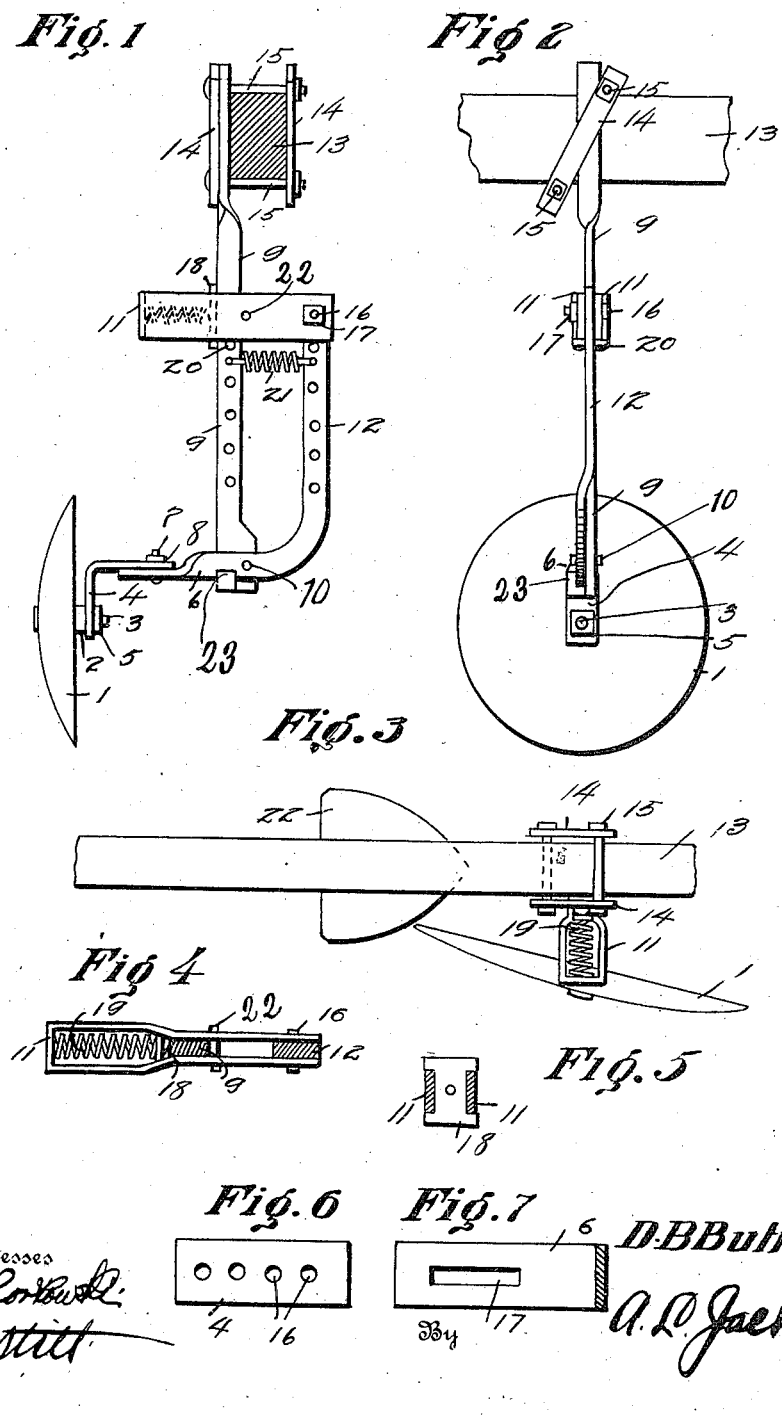

DAVID B. BUTTRILL, OF FORT WORTH, TEXAS.

COMBINED SCRAPER AND FENDER ATTACHMENT.

989,833.  Specification of Letters Patent.  Patented Apr. 18, 1911.

Application filed January 30, 1911. Serial No. 605,539.

*To all whom it may concern:*

Be it known that I, DAVID B. BUTTRILL, a citizen of the United States, residing at Fort Worth, in the county of Tarrant and State of Texas, have invented certain new and useful Improvements in Combined Scraper and Fender Attachments, of which the following is a specification.

This invention relates to plow attachments and more particularly to devices for regulating the plows for different purposes; and the object is to provide inexpensive devices for attaching disks to plow stocks and for controlling the disks to run more or less close to the plants, to vary the inclination of the disks from the vertical positions, to vary the angle which the disks make with the row of plants, and to provide a yielding shank to prevent the plows from being thrown out of place or broken when rocks or other objects are struck.

One object is to make a disk perform two functions,—one to scrape grass away from the plants and to prevent heavy particles or clods of dirt from falling on the plants when the disk is used with a sweep or other plow.

One object of this invention is to provide adjusting devices to regulate the amount of dirt to be thrown to the plants when the disk is used with a sweep or other plow.

Other objects and advantages will be fully explained in the following description and the invention will be more particularly pointed out in the claims.

Reference is had to the accompanying drawings which form a part of this application.

Figure 1 is a front elevation of the disk with the attaching devices. Fig. 2 is a side elevation of the same. Fig. 3 is a plan view of the same, showing the manner of using the disk with a sweep. Fig. 4 is a plan view of the bracket and spring for making the attaching shank or disk member yielding, the disk member and the beam member being shown in horizontal section. Fig. 5 is a detail view of the spring seat. Fig. 6 and Fig. 7 are detail plan views of portions of the attaching devices.

Similar characters of reference are used to indicate the same parts throughout the several views.

The adjusting devices are adapted to secure an inclination of the disk, that is, to permit a greater or less angle of the disk to a vertical position, and also to adjust the disk to a greater or less angle to the row of plants. The disk 1 is provided with a bearing 2 and a shaft 3 operating therein. An angle bar 4, or disk member, is secured on the shaft or spindle 3 by a nut 5. A yielding shank member 6 is fixedly adjusted on the disk member 4 by a bolt 7 and nut 8. The shank member 6 is twisted a quarter turn and pivotally connected to the beam member 9 by a bolt 10. The beam member 9 is attached to the plow beam 13 by clamps 14 and bolts 15 so that the beam member can be attached at any suitable point on the beam. The inclination of the disk from a vertical position is accomplished by swinging the shank 6 on the member 9 on its pivot bolt 10. The angle which the disk makes with the row of plants is varied by means of the bolt 7 which permits the angle bar 4 to swing on the shank member 6. The nut 8 is loosened and tightened for this purpose. When the nut 8 is tightened the bars 4 and 6 are held fixedly in place on each other. To provide for moving the disk farther from or closer to the row of plants a series of holes 16 are made in the bar 4 and a slot 17 is made in the bar 6. The bars 4 and 6 can thus be made to lap more or less on each other.

The disk attaching member is made yielding by means of an extension 12 of the shank 6. This extension 12 has a series of bolt holes. A bracket 11 is attached to the extension 12 by a bolt 16 and nut 17. This bracket consists of a bar bent in the form shown. The bracket is placed horizontally and incloses a portion of the beam member 9 and with its ends engaging the extension 12. A spring seat 18 is placed between the members of the bracket 11 and bears against the beam member 9. A coil spring 19 has one end inserted in the bracket 11 and the other end inserted in the spring seat 18. The extension 12 is thus held yieldingly toward the member 9. A stronger or weaker spring may be used to increase or decrease the tension. The bracket 11 rides on a bolt 20 which is inserted in the member 9 and a plurality of holes are made in the member 9 so that the bolt may be placed lower or higher. The leverage of the extension 12 can thus be decreased or increased by placing the bracket lower or higher. The spring 19 is a compression spring. A tension spring 21 can also be used for the same purpose, that is, to hold the extension 12 yieldingly toward the member 9. Either one or both springs can be used. This will prevent breaking or displacing the disk or other parts of the plow when the disk strikes a rock or other obstruction. It is apparent that the form of the spring can be varied.

With the adjusting devices shown the bar 4 can be swung on the bolt 7 to change the angle of the disk to the row of plants and the bar 6 can be swung on the bolt 10 to vary the angle of inclination or the inclination of the disk from a vertical position. If the disk is used with a sweep 22 the disk will catch the heavier particles or clods which are being thrown by the sweep toward the plants and will prevent the same from falling on the plants. The disk thus acts as a fender. The disk allows the finer particles or soft dirt to pass under the back edge thereof toward the plants and the amount of dirt allowed to be thrown to the plants may be regulated by varying the angle of the sweep to the row of plants and also by moving the position of the clamps 14 on the plow beam. If more dirt is to be thrown to the plants, move the disk farther forward from the sweep. To throw less dirt to the plants, move the disk back closer to the sweep. The front part of the disk acts as a scraper and the rear part of the disk acts as a fender.

The lower part of the beam member 9 has a lateral extension and the bolt 10 is placed in this extension so that the extension 12 may have a downward swing. A portion of the lower part or end of the member 9 is bent and formed into a lip 23 to prevent displacement of the part 6. The member 9 thus has a stirrup for the adjusting member 6. In order that the extension 12 may not swing too far toward the spring 19 a pin 22 is inserted in the bracket 11. The adjusting member is thus positively limited in its movement toward one side, but allowed to swing outwardly and downwardly on the other side.

Having fully described my invention, what I claim as new and desire to secure by Letters Patent, is,—

1. In a plow having a beam, a revolving disk and means for attaching the same to said beam in front of the plow to form a combined scraper and fender, said means consisting of a disk member attached to said disk, a beam member attached to said beam, an adjusting member fixedly attached to said disk member and pivotally attached to said beam member and having a vertical extension, a bracket attached to said extension and engaging said beam member loosely, and a spring mounted in said bracket and bearing against the bracket and against said beam member to hold said extension yieldingly in place.

2. In a plow having a beam, a revolving disk and means for attaching the same to said beam, said means consisting of a disk member attached to said disk, a beam member attached to said beam, an adjusting member and means for attaching the same to said disk member at different points of adjustment, said adjusting member having a vertical extension in line with said beam member, and a spring for holding said extension yieldingly in place, said adjusting member being pivotally connected to said beam member.

3. In a plow having a beam, a revolving disk and means for attaching the same to said beam, said means consisting of a disk member attached to said disk, a beam member attached to said beam, an adjusting member pivotally connected to said beam member, means for fixedly attaching said adjusting member to said disk member at different points of adjustment, said adjusting member having a vertical extension, a bracket pivotally connected to said extension and loosely engaging said beam member, a bearing bolt in said beam member to hold said bracket horizontally disposed, a coil spring mounted in said bracket and bearing against the bracket and against said beam member.

In testimony whereof, I set my hand in the presence of two witnesses, this 16th day of January, 1911.

DAVID B. BUTTRILL.

Witnesses:
A. L. JACKSON,
L. T. KNIGHT.

---

Copies of this patent may be obtained for five cents each, by addressing the "Commissioner of Patents, Washington, D. C."